(12) United States Patent
Nagl et al.

(10) Patent No.: US 6,226,144 B1
(45) Date of Patent: May 1, 2001

(54) ENERGY ABSORBING DISC TRAVEL LIMITER

(75) Inventors: Alan Thomas Nagl; Howard Irving Sohm, both of Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/133,274

(22) Filed: Aug. 12, 1998

Related U.S. Application Data

(60) Provisional application No. 60/055,909, filed on Aug. 15, 1997.

(51) Int. Cl.[7] .............................. G11B 17/00; G11B 33/08
(52) U.S. Cl. ....................................... 360/97.01; 360/97.02
(58) Field of Search ............................... 360/97.01, 97.02, 360/104, 105, 106

(56) References Cited

U.S. PATENT DOCUMENTS

| | | |
|---|---|---|
| 4,843,503 * | 6/1989 | Hazebrouck et al. ............... 360/106 |
| 5,121,278 | 6/1992 | Tanaka et al. . |
| 5,140,478 | 8/1992 | Yoshida . |
| 5,341,260 | 8/1994 | Jabbari . |
| 5,422,770 * | 6/1995 | Alt ....................................... 360/105 |
| 5,757,587 | 5/1998 | Berg et al. . |
| 5,801,899 * | 9/1998 | Genheimer ........................ 360/97.01 |

* cited by examiner

*Primary Examiner*—George J. Letscher
(74) *Attorney, Agent, or Firm*—Edward P. Heller, III

(57) ABSTRACT

An energy absorbing disc travel limiter which not only mechanically defines a limit to the extent to which a disc in a disc drive can be axially displaced in response to applied mechanical shocks, but which also acts to damp the shock-induced motion of the discs, thus preventing contact between the discs and the actuator head mounting arms. The amount of damping provided by the disc travel limiter is determined by selection of the material of the disc travel limiter and selection of certain dimensions of the disc travel limiter.

14 Claims, 5 Drawing Sheets

ENERGY ABSORBING DISC TRAVEL LIMITER

CROSS REFERENCE TO RELATED APPLICATION

This application claims priority from U.S. Provisional Application 60/055,909, filed Aug. 15, 1997.

FIELD OF THE INVENTION

This invention relates generally to the field of disc drive data storage devices, or disc drives, and more particularly, but not by way of limitation, to an energy absorbing disc travel limiter which prevents damage as a result of applied mechanical shocks.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable.

Furthermore, the amount of non-operating mechanical shock which the disc drive is specified to withstand is constantly being increased, with future disc drive products being considered which must be capable of operating after experiencing non-operating mechanical shocks in the range of 1000 G.

One shock test which the disc drive is expected to endure involves resting the disc drive on a hard surface, such as a table top, and then raising one end of the disc drive to a specified height and dropping the disc drive back onto the surface. In the course of conducting such tests, it was found that one failure mode was the result of the discs bending in the axial direction, often referred to as "coning", and coming into contact with the actuator head mounting arms. Such contact resulted in damage to the discs, the head arms or both, and the generation of particles within the sealed disc drive housing which were free to migrate and potentially interfere with the desired interface between the heads and discs.

The present invention is directed to prevention of this type of mechanical-shock-induced damage.

SUMMARY OF THE INVENTION

The present invention is an energy absorbing disc travel limiter which not only mechanically defines a limit to the extent to which a disc in a disc drive can be axially displaced in response to applied mechanical shocks, but which also acts to damp the shock-induced motion of the discs, thus preventing contact between the discs and the actuator head mounting arms. The amount of damping provided by the disc travel limiter is determined by selection of the material of the disc travel limiter and selection of certain dimensions of the disc travel limiter.

It is an object of the invention to provide a mechanism for limiting the extent to which the outer diameter of the discs of a disc drive can move axially in response to applied mechanical shock.

It is another object of the invention to provide a mechanism which damps the movement of the outer diameter of the discs of a disc drive in response to applied mechanical shock.

It is another object of the invention to provide a mechanism for the above stated purposes which is simple and economical to implement in a high-volume manufacturing environment.

The manner in which the present invention achieves the objects stated, along with other features, advantages and benefits of the invention, can best be understood by a review of the following Detailed Description of the Invention, when read in conjunction with a review of the accompanying drawings.

DETAILED DESCRIPTION OF THE INVENTION

Figure 1:
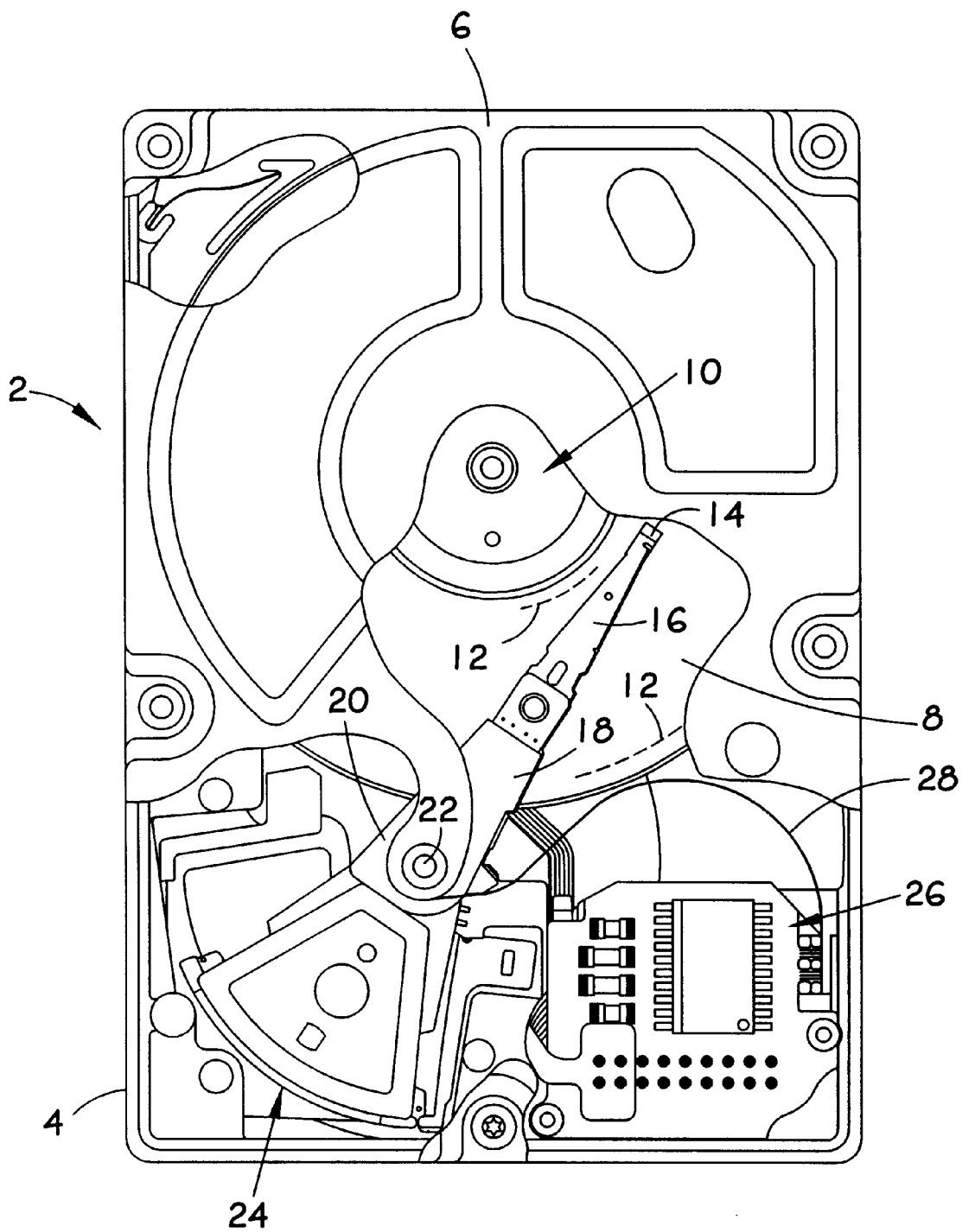
FIG. 1 is a top view, in partial cutaway, of a disc drive in which the present invention is particularly useful.

Turning now to the drawings and specifically to FIG. 1, shown is a plan view of a prior art disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

As is apparent from an examination of FIG. 1, the actuator head mounting arms 18 extend radially outward from the pivot shaft 22 to positions over the discs 8. The phenomenon which the present invention is intended to prevent is illustrated in FIG. 2.

Figure 2:
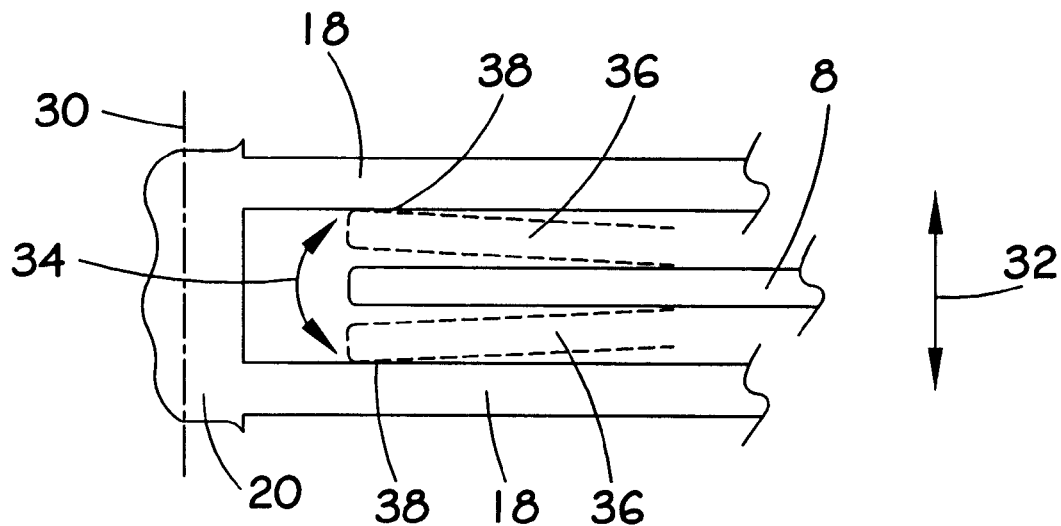
FIG. 2 is a simplified detail elevation view of a disc and cooperating actuator head mounting arms in a prior art disc drive, illustrating the phenomenon which the present invention is intended to prevent.

FIG. 2 is a simplified detail elevation view of a prior art disc drive and shows generally the relationship between a disc 8 mounted between two adjacent actuator head mounting arms 18, which extend radially from the actuator bearing housing 20. It will be recalled that the actuator bearing housing is typically mounted via an array of ball bearings to rotate about a pivot shaft (22 in FIG. 1), represented in FIG. 2 by a pivot axis 30.

While the figure shows a single disc 8 between a single pair of actuator head mounting arms 18, one of skill in the art will appreciate that the scope of the present invention is not envisioned as being limited by the actual number of discs 8 and head mounting arms 18 in the disc drive, and that the figure shows a single disc 8 purely for purposes of discussion.

Since the disc 8 is supported by the hub of the spindle motor (10 in FIG. 1) only at its inner diameter, when mechanical shock is applied to the disc drive along an axis normal to the plane of rotation of the disc 8, as represented by double headed arrow 32, the outer diameter of the disc 8 is axially displaced from its normal operation position, as shown generally by curved double headed arrow 34. This displacement of the outer diameter of the disc 8 is the phenomenon known as "disc coning", since the disc 8 is momentarily deformed from its normal flat condition into a conical shape, as represented in the figure by dashed lines at 36.

If the applied mechanical shock is of sufficient magnitude, this disc coning can result in contact between the outer diameter of the disc 8 and the actuator head mounting arm 18, as shown at points designated by numerical references 38, and such contact can result in damage to either the disc 8, the actuator head mounting arm 18 or both. Furthermore, it will be apparent to one of skill in the art that such contact can also result in the generation of particles which, during subsequent operation of the disc drive, can cause fatal damage to the disc 8, the read/write heads (14 in FIG. 1) or both.

The present invention acts to prevent such potentially fatal contact between the disc 8 and the actuator head mounting arms 18 by limiting the extent of travel of the outer diameter of the disc along path 34.

Figure 3:
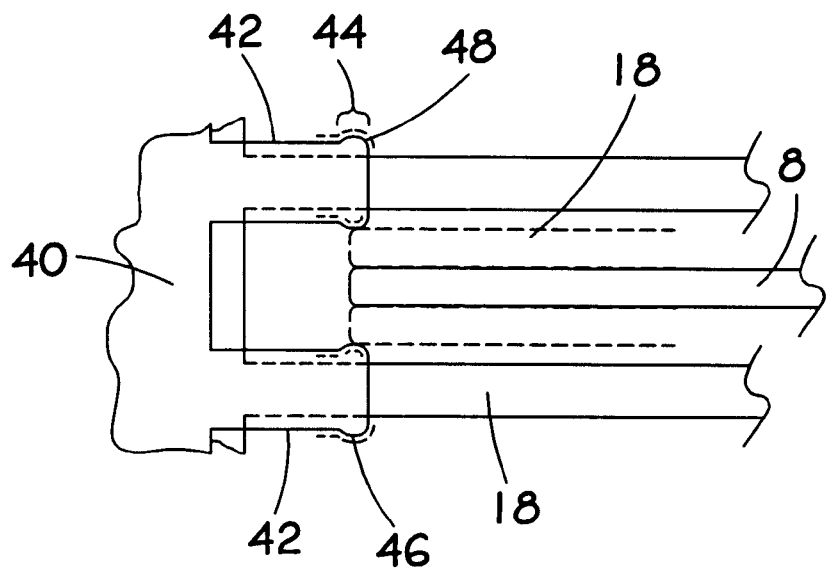
FIG. 3 is a simplified detail elevation view, similar to FIG. 2, illustrating the operation of the present invention.

FIG. 3 is a simplified detail elevation view, similar to that of FIG. 2, illustrating the function of the disc travel limiter of the present invention.

FIG. 3 shows a disc 8 in cooperative operational relationship between a pair of actuator head mounting arms 18, as in FIG. 2. Once again, it should be noted that the figure shows a single disc 8 purely for discussion purposes, and that the scope of the present invention is not envisioned as being limited by the actual number of discs 8 in the disc drive.

FIG. 3 also shows the disc travel limiter (designated generally at 40) of the present invention. From the figure, it can be seen that the disc travel limiter 40 includes a plurality of limiter arms 42 which extend radially over the outermost diameter of the discs 8. Each limiter arm 42 includes a cantilevered member 43 and a contact feature, shown generally at 44. These contact features 44 further include contact surfaces 46 which are axially located beyond the surfaces of the actuator head mounting arms 18, i.e., closer to the disc surfaces than the surfaces of the actuator head mounting arms 18. Thus, when an applied mechanical shock causes coning of the disc 8, as shown by undesignated dashed lines in FIG. 3, the travel of the outer diameter of the disc 8 is stopped by contact with the contact surface 46 of the disc travel limiter 40 before the disc 8 can make contact with the actuator head mounting arm 18. The present invention envisions that the disc travel limiter 40 will be fixedly mounted to the disc drive base member (4 in FIG. 1) at a location that brings the contact features 46 into contact with the discs 8 in a non-data area of the discs 8 closely adjacent the outer diameter of the disc 8.

As can also be seen in FIG. 3, the present invention also contemplates that contact between the disc 8 and the disc travel limiter 40 at the contact surface 46 will result in minor axial displacement of the limiter arms 42, as shown by dashed lines 48. The material of the disc travel limiter, as well as its mechanical dimensions, must be selected to ensure that such axial displacement of the limiter arms 42 stops short of the point where contact between the disc 8 and the actuator head mounting arm 18 can occur.

Furthermore, since such displacement of the limiter arm 42 results in strain energy being accumulated in the limiter arm 42, the present invention envisions that the disc travel limiter be made from a low-modulus material that will allow the disc 8 to begin moving back to its normal operational position faster than the limiter arm 42 will return to its unstressed quiescent position. Thus, the disc travel limiter 40 of the present invention serves not only to limit the extent of axial travel of the outer diameter of the disc 8 in response to applied mechanical shock, but also acts as a dampener to absorb and dissipate the energy induced within the disc 8 as a result of coning.

Examples of appropriate low-modulus plastics which can be used to implement the disc travel limiter 40 of the present invention are thermoplastic compounds with conductivity additives such as are commercially available under the trademark STAT-KONG® from LNP Engineering Plastics of Exton, Pa., and polyetherimide compounds such as are commercially available under the trademark ULTEM® from GE Plastics of Pittsfield, Mass. It has also been found that, in certain specific applications, 5052 H34-36 aluminum is an appropriate material. In general, a wide range of materials can be used to implement the present invention, so long as the limiter arms have a natural resonant frequency which is equal to or lower than the natural resonant frequency of the discs as mounted to the spindle motor hub. Dependent on the specific disc drive within which the present invention is implemented, and the amount of applied mechanical shock which the disc drive is specified to withstand, other materials may also be selected without exceeding the envisioned scope of the present invention.

While the phenomenon of disc coning results in axial displacement of the entire outer diameter of the disc, it has been determined by experimentation that the disc travel limiter of the present invention functions optimally when the disc travel limiter is located as closely as practicable to the portion of the discs overlain by the actuator head mounting arms in their travel from the innermost data track to the outermost data track. Alternatively, since the disc travel limiter of the present invention is primarily intended to function in response to the application of non-operating mechanical shocks, the disc travel limiter can be mounted to the actuator body (20 in FIG. 1). In implementations of the invention which mount the disc travel limiter to move with the actuator, the disc travel limiter is mounted to engage the outer diameter of the discs only when the actuator is at its park location, with the read/write heads closely adjacent the inner diameter of the discs. Thus, during normal disc drive operation, the disc travel limiter has no effect on disc drive operation.

Figure 4:
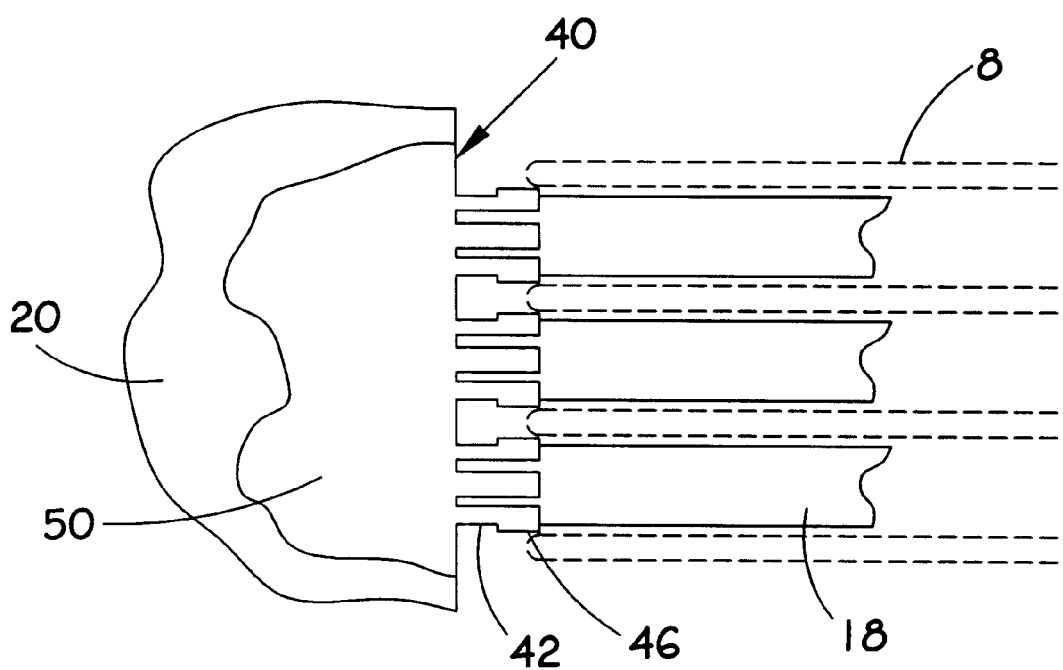
FIG. 4 is a perspective view of a first embodiment of a disc travel limiter made in accordance with the present invention.

Such an implementation of the invention is shown in FIG. 4, which is an elevation view, in partial cutaway, of an actuator body 20 to which the disc travel limiter 40 has been directly mounted. Extending from the actuator body 20 are a plurality of actuator head mounting arms 18, and a cooperative arrangement of discs 8 are shown with dashed lines. The disc travel limiter 40 includes a backing member 50 of fixed to the actuator body 20, and a plurality of limiter arms 42 which project from the backing member 50. Each limiter arm 42 includes first and second cantilevered members 43, 45 which extend as shown. The first cantilevered members 43 include contact surfaces which lie over the outermost portion of the discs 8.

The relationship between the discs 8 and the actuator body 20 and disc travel limiter 40 are shown as they would be when the actuator is at a parked position, i.e., with the heads (14 in FIG. 1) closely adjacent the inner diameter of the discs 8, as is shown in FIG. 1. It will be appreciated by one of skill in the art that, as the actuator rotates the heads radially outward on the discs 8, the position of the disc travel limiter 40 will also be moved radially outward relative to the discs 8, thus taking the disc travel limiter 40 out of axial alignment with the discs 8. Thus the disc travel limiter 40 is only operable when the heads are in the parked position, as would be the case when the disc drive is in a non-operating condition.

Figure 5:
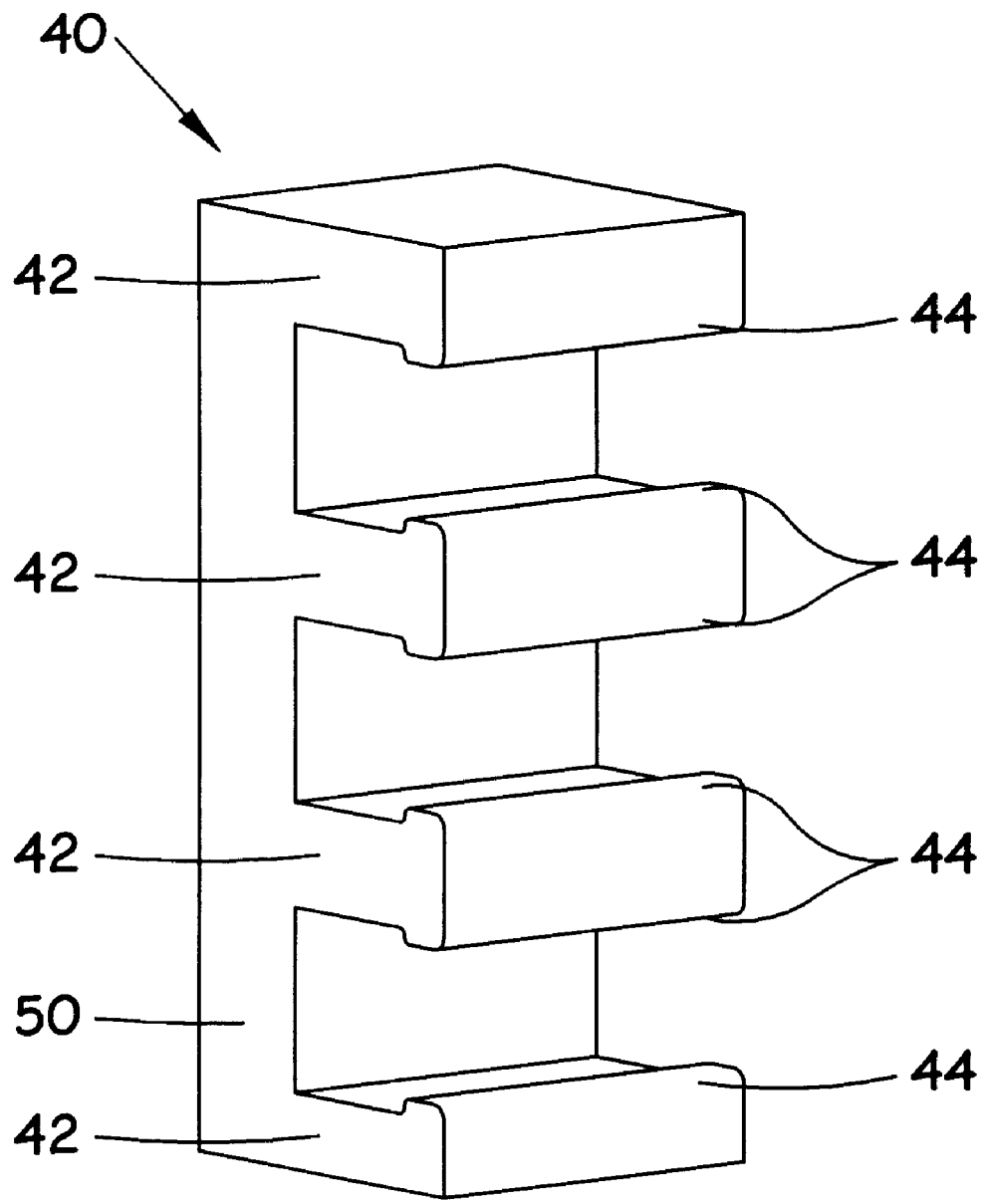
FIG. 5 is a perspective view of a second embodiment of a portion of a disc travel limiter made in accordance with the present invention.

FIG. 5 is a perspective view of another embodiment of a disc travel limiter 40 made in accordance with the present invention. The example disc travel limiter 40 shown in the figure is suitable for use in a disc drive utilizing three discs. A person of skill in the art will appreciate, however, that the disc travel limiter 40 can be readily modified for use with either a greater or lesser number of discs, and the scope of the invention should not, therefore, be considered as limited by the number of discs in the disc drive.

In FIG. 5, the disc travel limiter 40 can be seen to include four limiter arms 42 separated by three inter-arm spaces within which the discs (not shown) of the disc drive will be located. The limiter arms 42 are connected by a backing member 50 which is also used to mount the entire disc travel limiter 40 to the disc drive housing. The specific method used to mount the disc travel limiter 40 within the disc drive housing is not considered as being limiting to the scope of the invention. For instance, the bottom surface of the backing member 50 could include one or more tapped holes with the disc travel limiter 40 attached by a screw or screws, inserted through the bottom surface of the disc drive base member (4 in FIG. 1), or the disc travel limiter 40 could be adhesively attached to the base member. Other methods of attachment may suggest themselves to one of skill in the art without exceeding the envisioned scope of the invention.

FIG. 5 shows the limiter arms include cantilevered members 43 and contact features 44 which are generally semi-cylindrical in form. These semi-cylindrical contact surfaces 44 provide line-contact with the surfaces of the discs when an applied mechanical shock induces coning of sufficient magnitude, as previously described in relationship to FIG. 3 above.

As previously mentioned hereinabove, the present invention envisions that the disc travel limiter 40 will not only act as a limiter to contact the disc before it makes contact with the actuator head mounting arms (18 in FIGS. 1, 2 and 3), but also serve as a dampener to dissipate the energy caused by the application of mechanical shocks. The first design decision in implementing the present invention is the selection of an appropriate low-modulus material, as noted above. Further control of the amount of dampening provided by the disc travel limiter 40 can be achieved by selection of the dimensions of certain elements of the disc travel limiter.

Dimensions which can be selected to determine the dampening characteristics include the length of the limiter arms 42 (i.e., the distance which the limiter arms 42 extend from the backing member 50), the width of the limiter arms 42 (i.e., the length of the linear contact surface), and, to the extent permitted by the interdisc spacing, the thickness of the limiter arms 42. The selection of these dimensions will, of course, be dependent upon such variables as the amount of applied mechanical shock which the disc drive is specified to withstand, the moving mass of the discs within the disc drive, the material characteristics of the disc travel limiter, all in accordance with well known behavioral characteristics of cantilevered beam elements.

Figure 6:
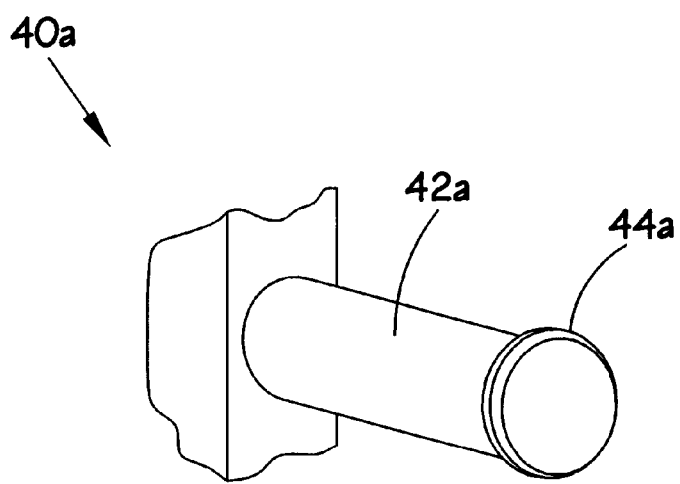
FIG. 6 is a perspective view of another embodiment of a portion of a disc travel limiter made in accordance with the present invention.

FIG. 6 shows an alternative configuration of the limiter arm 42a of the disc travel limiter 40a. In the figure, a single limiter arm 42a comprises a cantilevered member 43a extending from a backing member 50a, and can be seen to be generally cylindrical in form, as opposed to the substantially rectilinear form of the disc travel limiter 40 of FIG. 5. The contact feature 44a of this second embodiment of the invention is generally circular, with a semi-cylindrical outer surface. This configuration provides a single-point contact with the disc, in contrast with the line-contact provided by the embodiment of FIG. 5.

Once again, control of the dampening characteristics of the disc travel limiter 40a can be controlled by selection of the material and dimensions of the limiter arm 42a.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiments, certain variations and modifications may be suggested to one of skill in the art upon reading this disclosure. Therefore, the scope of the present invention should be considered to be limited only by the following claims.

What is claimed is:

1. A disc travel limiter for preventing contact between a disc and a pair of actuator head mounting arms disposed adjacent opposing surfaces of the disc in a disc drive comprising:
   a backing member disposed beyond an outermost diameter of the disc; and
   a pair of limiter arms extending from the backing member, each limiter arm adjacent a respective surface of the disc and comprising:
      a cantilevered member which extends at a first distance from the respective surface and comprises a proximal end affixed to the backing member; and
      a radiused contact surface which projects from a distal end of the cantilevered member and tapers toward the respective surface to a second distance from said surface less than said first distance so that the disc contacts a portion of the radiused contact surface when the disc is deflected in response to application of a mechanical shock to the disc drive.

2. A disc travel limiter as claimed in claim 1 wherein the disc travel limiter is formed of a low-modulus material.

3. A disc travel limiter as claimed in claim 1 wherein each cantilevered member generally extends along a limiter arm axis and has a generally rectilinear cross-section in a direction normal to the limiter arm axis.

4. A disc travel limiter as claimed in claim 1 wherein each cantilevered member generally extends along a limiter arm axis and has a generally curvilinear cross-section in a direction normal to the limiter arm axis.

5. A disc travel limiter as claimed in claim 1 wherein the backing member is mounted to a housing of the disc drive in a fixed relationship to the disc.

6. A disc travel limiter as claimed in claim 1 wherein the actuator head mounting arms are integral to a moveable actuator body, and the backing member is mounted to the actuator body.

7. A disc travel limiter as claimed in claim 1 wherein, for each limiter arm the cantilevered member is characterized as a first cantilevered member and wherein each limiter arm further comprises a second cantilevered member which extends substantially parallel to the first cantilevered member adjacent the respective surface so that a gap is formed between the first and second cantilevered members, wherein the first and second cantilevered members are operationally configured so that the second cantilevered member impedes deflection of the first cantilevered member when the disc contacts the portion of the radiused contact surface.

8. A disc travel limiter as claimed in claim 1 wherein the disc drive comprises a plurality of discs and the disc travel limiter comprises a plurality of adjacent pairs of the limiter arms, each one of the discs disposed between a corresponding one of the adjacent pairs of the limiter arms.

9. A disc drive which incorporates the disc travel limiter of claim 1.

10. A disc travel limiter for preventing contact between a disc and a pair of actuator head mounting arms disposed adjacent opposing surfaces of the disc in a disc drive comprising:
    a backing member disposed beyond an outermost diameter of the disc; and
    a pair of limiter arms extending from the backing member, each limiter arm adjacent a respective surface of the disc and comprising:
       a first cantilevered member extending at a first distance from the respective surface and having a proximal end affixed to the backing member; and
       a second cantilevered member extending substantially parallel to the first cantilevered member at a second distance from the respective surface greater than the first distance so that a gap is formed between the first and second cantilevered members, wherein the first cantilevered member is operationally configured to deflect when the disc contacts the limiter arm and wherein the second cantilevered member is operationally configured to limit the deflection of the first cantilevered member when the first cantilevered member, wherein each of the limiter arms further comprises a radiused contact surface which projects from a distal end of the first cantilevered member and tapers toward the respective surface to a third distance from said surface less than said first distance so that the disc contacts a portion of the radiused contact surface when the disc is deflected in response to application of a mechanical shock to the disc drive contacts the second cantilevered member.

11. A disc travel limiter as claimed in claim 10 wherein the disc travel limiter is formed of a low-modulus material.

12. A disc travel limiter as claimed in claim 10 wherein the backing member is mounted to a housing of the disc drive in a fixed relationship to the disc.

13. A disc travel limiter as claimed in claim 10 wherein the actuator head mounting arms are integral to a moveable actuator body, and the backing member is mounted to the actuator body.

14. A disc drive which incorporates the disc travel limiter of claim 10.

* * * * *